(12) United States Patent
Tsai et al.

(10) Patent No.: US 9,369,400 B2
(45) Date of Patent: Jun. 14, 2016

(54) WIRELESS RECEIVING SYSTEM AND SIGNAL PROCESSING METHOD THEREOF

(71) Applicant: MStar Semiconductor, Inc., Hsinchu Hsien (TW)

(72) Inventors: Teng-Han Tsai, Hsinchu County (TW); Yu-Che Su, Hsinchu County (TW); Tai-Lai Tung, Hsinchu County (TW)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 72 days.

(21) Appl. No.: 14/194,898

(22) Filed: Mar. 3, 2014

(65) Prior Publication Data

US 2014/0247715 A1    Sep. 4, 2014

(30) Foreign Application Priority Data

Mar. 1, 2013 (TW) ............................... 102107332 A

(51) Int. Cl.
*H04L 12/911* (2013.01)
*H04L 27/26* (2006.01)
*H04W 56/00* (2009.01)

(52) U.S. Cl.
CPC ............ *H04L 47/70* (2013.01); *H04L 27/2656* (2013.01); *H04W 56/003* (2013.01); *H04W 56/0085* (2013.01)

(58) Field of Classification Search
CPC ............... H04L 47/70; H04L 27/2656; H04W 56/0085; H04W 56/003
See application file for complete search history.

(56) References Cited

U.S. PATENT DOCUMENTS

| 5,673,259 | A  | * | 9/1997  | Quick, Jr. ...................... 370/342 |
| 6,490,454 | B1 |   | 12/2002 | Kangas et al. |
| 6,907,044 | B1 | * | 6/2005  | Yonge et al. ................... 370/445 |
| 7,352,770 | B1 | * | 4/2008  | Yonge et al. ................... 370/445 |
| 8,116,290 | B2 |   | 2/2012  | Moorti et al. |
| 2005/0138194 | A1 |   | 6/2005  | Lu et al. |
| 2005/0163275 | A1 | * | 7/2005  | Yamada ............. H04L 29/06027 375/365 |
| 2006/0120454 | A1 | * | 6/2006  | Park ....................... H04N 19/52 375/240.16 |
| 2008/0232400 | A1 | * | 9/2008  | Tsai ....................... H04L 27/00 370/468 |
| 2008/0279126 | A1 | * | 11/2008 | Katar et al. .................... 370/294 |
| 2011/0013618 | A1 | * | 1/2011  | Wu ................... 370/352 |
| 2014/0247715 | A1 | * | 9/2014  | Tsai .................. H04W 56/0085 370/230 |

OTHER PUBLICATIONS

Taiwan Intellectual Property Office, "Office Action", Oct. 14, 2014.

* cited by examiner

*Primary Examiner* — Benjamin H Elliott, IV
(74) *Attorney, Agent, or Firm* — WPAT, PC; Justin King; Jonathan Chiang

(57) ABSTRACT

A wireless system including a decoding module, an estimating module and a searching module is provided. The decoding module receives and decodes a packet to generate a decoding result. The estimating module retrieves package length information from the decoding result, and estimates a transmission end time of the packet according to the packet length information. The searching module determines a search start time according to the transmission end time, and starts packet searching at the search start time.

16 Claims, 4 Drawing Sheets

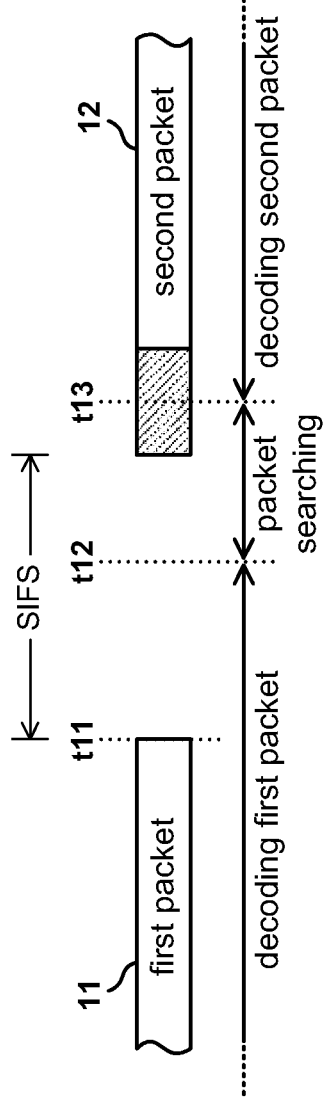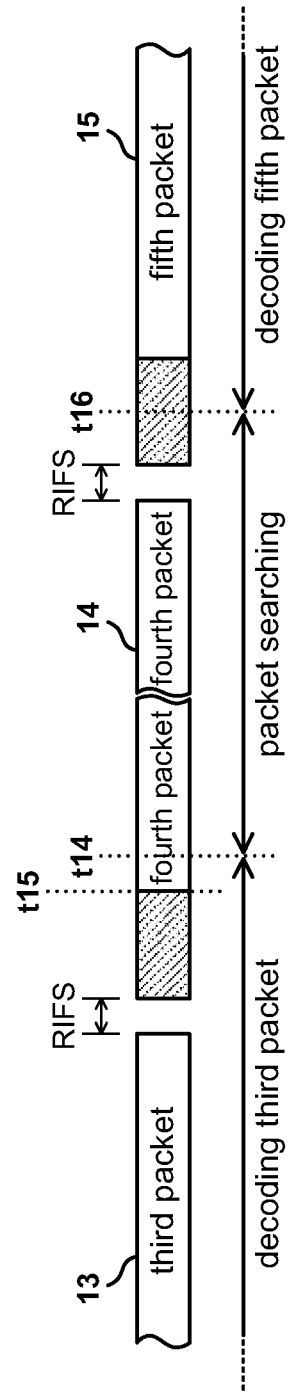
FIG. 1(A) (prior art)
FIG. 1(B) (prior art)

legacy mode high throughput mixed mode high throughput greenfield mode

US 9,369,400 B2

WIRELESS RECEIVING SYSTEM AND SIGNAL PROCESSING METHOD THEREOF

This application claims the benefit of Taiwan application Serial No. 102107332, filed Mar. 1, 2013, the subject matter of which is incorporated herein by reference.

BACKGROUND OF THE INVENTION

1. Field of the Invention

The invention relates in general to a wireless communication system, and more particularly, to a technique for detecting data packets.

2. Description of the Related Art

A wireless local area network (WLAN) system transceives data in a unit of packets. To lower possibilities of collisions between packets so as to enhance transmission quality, two successive packets are transmitted with a constant time interval in between. Such time interval is usually 16 µs, and is referred to as a short interframe space (SIFS) interval.

FIG. 1(A) shows a schematic diagram of a relationship between packets with the SIFS interval. A decoding latency is in general present at a receiver. Taking FIG. 1(A) for example, a time point t12 at which the receiver finishes decoding a first packet 11 is later than a time point t11 at which the first packet 11 is completely transmitted to the receiver. The interval between the time points t11 and t12 is the decoding latency. After finishing decoding the first packet 11, the receiver starts detecting whether a next packet exists in the transmission channel. A preamble at the beginning of a packet is a reference for the receiver to determine the existence of a packet, and is predetermined data having a total length of 8 µs. In the example in FIG. 1(A), after identifying the preamble (the shaded area) of the second packet 12, at a time point t13, the receiver confirms the existence of the second packet 12 and then starts decoding the second packet 12.

In the 802.11n specifications, a packet format having a shorter interval is defined for promoting network transmission efficiency. The length of such reduced interframe space (RIFS) is only 2 µm. FIG. 1(B) shows a schematic diagram of a relationship between packets with the RIFS interval. The receiver finishes decoding a third packet 13 at a time point t14. As seen from FIG. 1(B), due to the decoding latency, the time point t14 at which the receiver starts detecting the existence of a next packet is later than a time point t15 at which the transmission of the preamble of a fourth packet 14 ends. Not until a time point t16, the receiver cannot identify the preamble of a fifth packet 15 and start decoding the fifth packet 15. It is apparent that the receiver misses data carried in the fourth packet 14. One solution for solving the above issue is to utilize a circuit with a faster computation speed at the receiver to shorten the decoding latency, and to thus bring forward the time point t14 to be earlier than the time point t15. However, such solution not only significantly increases hardware costs but also poses addition power consumption on the receiver.

SUMMARY OF THE INVENTION

The invention is directed to a wireless receiving system and a signal processing method thereof for bringing forward the searching process for a next packet and thus solving the issue of a missing packet resulted from the decoding latency. Without involving a circuit having a faster computation speed, hardware costs and power consumption of the system and method according to the present invention are reduced.

According to an embodiment of the present invention, a wireless receiving system including a decoding module, an estimating module and a searching module is provided. The decoding module receives and decodes a packet to generate a decoding result. The estimating module retrieves packet length information from the decoding result, and estimates a transmission end time of the packet according to the packet length information. The searching module determines a search start time according to the transmission end time, and starts packet searching at the search start time.

According to another embodiment of the present invention, a signal processing method applied to a wireless receiving system is provided. The method includes steps of: receiving and decoding a packet to generate a decoding result; retrieving packet length information from the packet result, and estimating a transmission end time of the packet according to the packet length information; and determining a search start time according to the transmission end time, and starting packet searching at the search start time.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 1(A) is a schematic diagram of a relationship between packets with a SIFS interval; FIG. 1(B) is a schematic diagram of a relationship between packets with a RIFS interval;

DETAILED DESCRIPTION OF THE INVENTION

Figure 2:
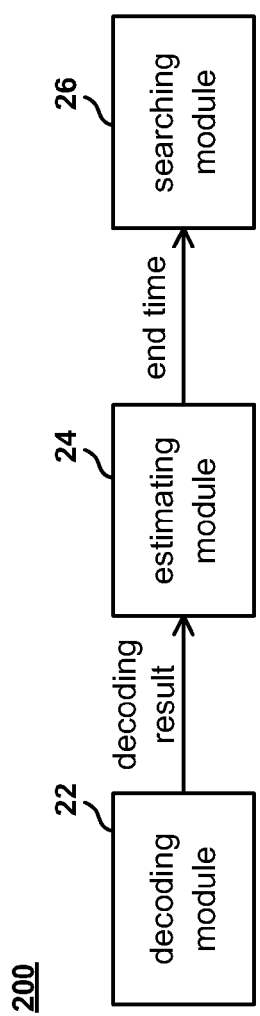
FIG. 2 is a block diagram of a wireless receiving system according to an embodiment of the present invention.

FIG. 2 shows a block diagram of a wireless receiving system according to an embodiment of the present invention. A wireless receiving system 200 includes a decoding module 22, an estimating module 24 and a searching module 26. It can be easily appreciated by one person skilled in the art that the wireless receiving system 200 may further include optional functional blocks that are not depicted in FIG. 2, e.g., an antenna, an auto-gain controller and an analog-to-digital converter (ADC). To precisely present the spirit of the present invention, the description below focuses on operations of the decoding module 22, the estimating module 24 and the searching module 26. Further, in the embodiments, the wireless receiving system 200 is exemplified by a wireless communication system compliant to the 802.11n specifications for explaining the present invention, not limiting the present invention.

Figure 3:
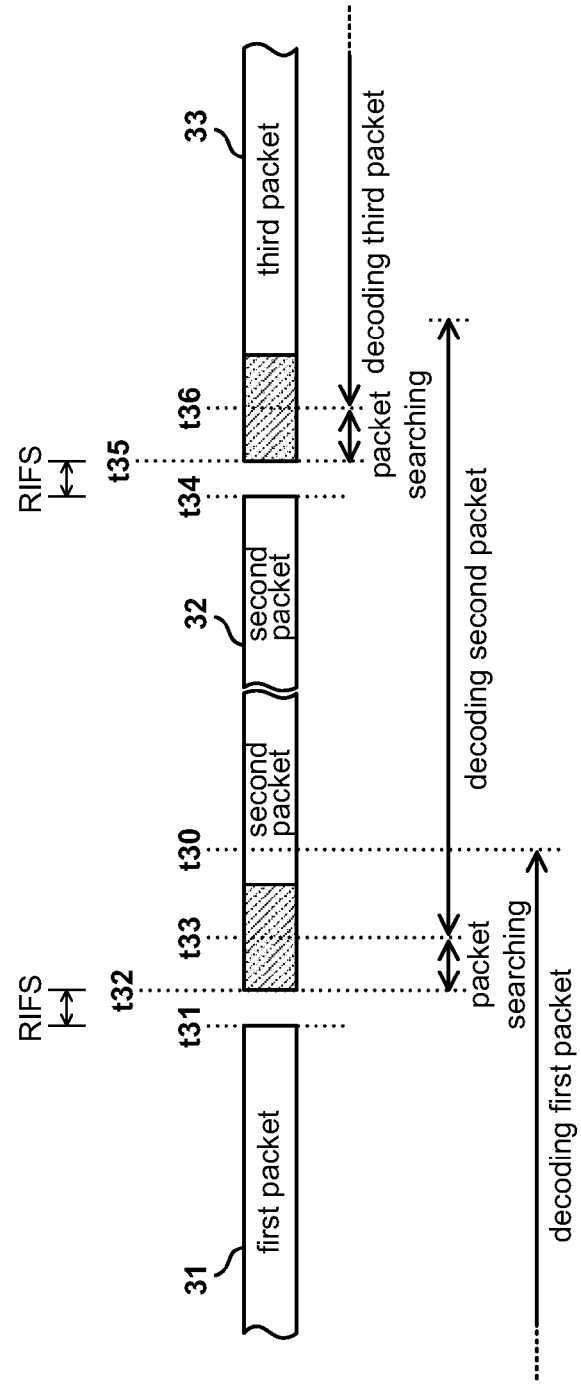
FIG. 3 is a schematic diagram of a relationship of packets with a RIFS interval and corresponding operation timings of a wireless receiving system according to the present invention.

FIG. 3 shows a schematic diagram of 802.11n packets with the RIFS interval and exemplary corresponding operation timings of the wireless receiving system 200. The decoding module 22 receives and decodes a packet. As seen from FIG. 3, a first packet is completely transmitted to the wireless receiving system 200 at a time point t31, and the decoding module 22 finishes decoding the first packet 31 only at a time point t30. The interval between the time points t30 and t31 is referred to as the decoding latency. It should be noted that, the method for decoding 802.11n packets is known to one person skill in the art, and shall be omitted herein.

The estimating module 24 retrieves packet length information from a decoding result generated by the decoding module 22, and estimates a transmission end time (i.e., the time at which the end of a packet is transmitted to the wireless receiving system 200) of a packet according to the packet length information. Take the first packet 31 for example. In practice, the time at which the beginning of the first packet 31 is transmitted to the wireless receiving system 200 is known. Therefore, given an estimated length of the first packet 31 is obtained, the estimating module 24 may estimate the time at which the first packet 31 is completely transmitted (i.e., the time point t31 in FIG. 3). More specifically, a transmission end time of a packet is a transmission start time added with an estimated length of the packet.

Figure 4A:
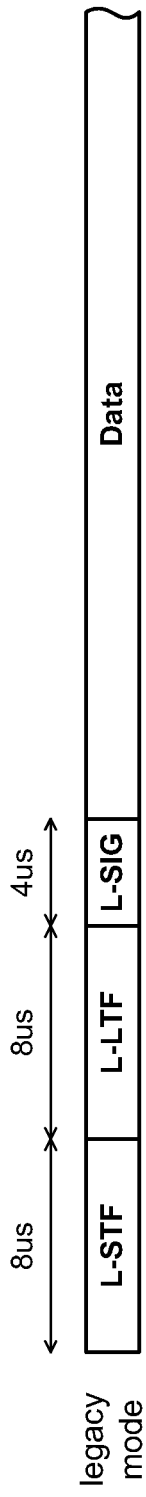
FIG. 4(A) to FIG. 4(C) are three packet formats specified in the 802.11n specifications.
Figure 4B:
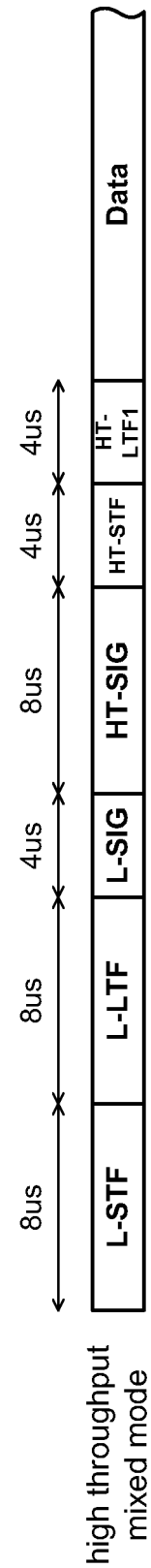
Figure 4C:
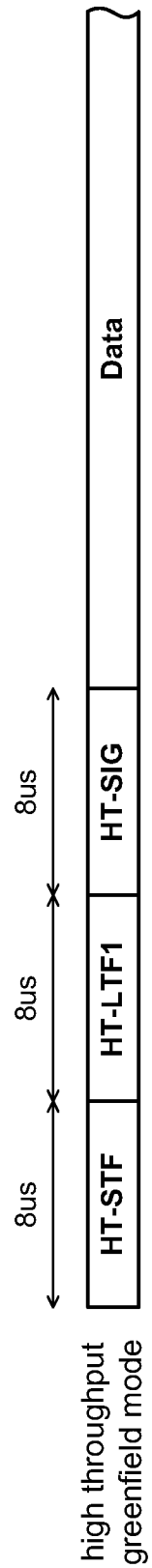

The 802.11n specifications specify three packet formats: legacy, high throughput mixed, and high throughput greenfield. These three types of packets have different lengths and contents, and have structures depicted by schematic diagrams in FIGS. 4(A) to 4(C), respectively. L-SIG sections and HT-SIG sections carry parameters of packet length information of transmitted packets. For a legacy packet, the packet length information includes a parameter LENGTH and parameter N_DBPS, and the estimating module 24 may estimate the packet length according to an equation below:

$$\text{Ceiling}((\text{LENGTH}*8+22)/N\_DBPS)*4 \, \mu s \quad (1)$$

In equation (1), the calculation symbol Ceiling represents a minimum integer greater than or equal to a calculation target, the parameter LENGTH represents the number of bytes of data that is not transmitted by a high throughput mode, and the parameter N_DBPS represents the number of bits of data transmitted by each OFDM symbol in a packet. Further, the calculation result of equation (1) indicates the length of remaining contents of a packet after an L-SIG section. In other words, the estimated length of the entire packet can be obtained by adding the calculation result of equation (1) with a predetermined packet section length (i.e., the known lengths of the first sections).

For a packet transmitted by a high throughput mixed mode and having a normal guard interval, the packet length information includes a parameter HT_LENGTH and a parameter HT_N_DBPS, and the estimating module 24 may estimate the packet length according to an equation below:

$$\text{Ceiling}((HT\_LENGTH*8+22)/HT\_N\_DBPS)*4 \, \mu s+8 \, \mu s \quad (2)$$

In equation (2), the parameter HT_LENGTH represents the number of bytes that are transmitted by a high throughput mode (including the high throughput mixed mode and a high throughput greenfield mode), and the parameter HT_N_DBPS represents the number of bits of data transmitted by each OFDM symbol in a packet. Further, the calculation result of equation (2) indicates the length of remaining contents of a packet after an HT-SIG section.

For a packet transmitted by the high throughput mixed mode and having a short guard interval, the estimating module 24 may estimate the packet length according to an equation below:

$$\text{Ceiling}((HT\_LENGTH*8+22)/HT\_N\_DBPS)*3.2 \, \mu s+8 \, \mu s \quad (3)$$

For a packet transmitted by the high throughput greenfield mode, the packet length information includes the parameter HT_LENGTH and the parameter HT_N_DBPS, and the estimating module 24 may estimate the packet length according to an equation below:

$$\text{Ceiling}((HT\_LENGTH*8+22)/HT\_N\_DBPS)*4 \, \mu s \quad (4)$$

A calculation result of equation (4) indicates the length of remaining contents of a packet following the HT-SIG section.

Compared to the decoding procedure, operations for estimating a packet length are relatively simpler. Therefore, the estimating module 24 may easily estimate the transmission end time of the first packet 31 before the first packet 31 is completely decoded. According to the transmission end time of the first packet 31, the searching module 26 determines a search start time, and starts packet searching at the search start time. In the example depicted in FIG. 3, the searching module 26 adds the transmission end time of the first packet 31 with a known minimum packet interval to generate a start time point t32 for searching for a next packet. For 802.11n packets with the RIFS interval, the minimum packet interval is 2 µs. According to the preamble of the second packet 32, the searching module 26 confirms the existence of the second packet 32 at a time point t33. It should be noted that, given an appropriate buffering mechanism or parallel circuit, the decoding module 22 may capably start decoding the second packet 32 at the time point t33 although the decoding module 22 has not yet finished decoding the first packet 31.

In principle, the search start time is set to ensure that contents of the second packet 32 are not missed by the wireless receiving system 200. In another embodiment, the searching module 26 may set the search start time at the time point t31, between the time points t31 and t32, or to be slightly later than the time point t32. By setting the search start time as a transmission end time of a packet added with a minimum packet interval, the searching module 26 consumes no unnecessary power between the time points t31 and t32 before the preamble of the packet appears.

Similarly, before the second packet 32 ends, the estimating module 24 estimates that the transmission end time of the second packet 32 is t34, and the searching module 26 adds the time point t34 with the minimum packet interval to determine that the next search start time is the time point t35. In the example in FIG. 3, the searching module 26 confirms the existence of a third packet 36 at a time point t36, and the decoding module 22 also starts decoding the third packet 33 at the time point t36.

It is demonstrated by the above description that, the search start time in the present invention is independent from the length of the decoding latency, and so the issue of missing packets resulted from the decoding latency is eliminated. It should be noted that, as the wireless receiving system 200 needs not to involve a circuit having a faster computation speed for shortening the decoding latency, hardware costs and power consumption are significantly reduced.

Figure 5:
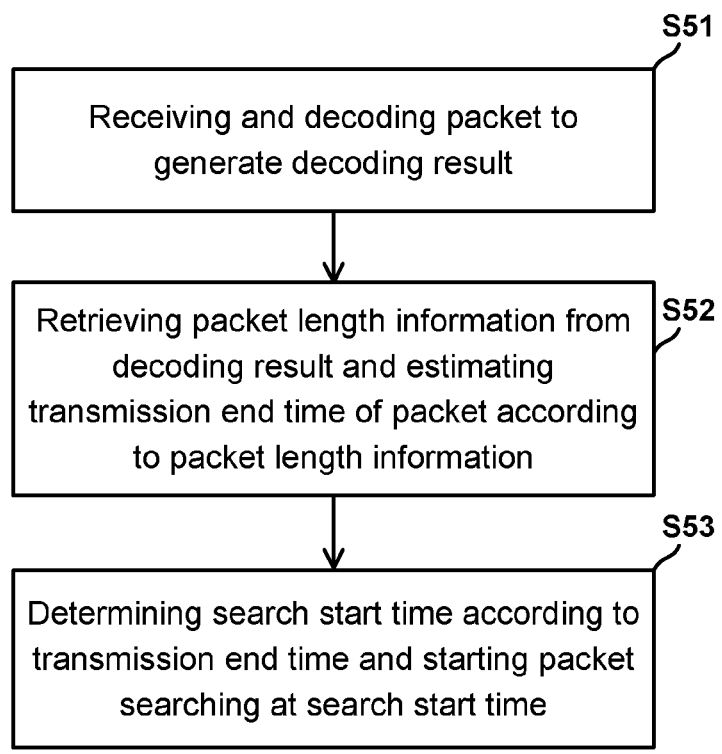
FIG. 5 is a flowchart of a signal processing method according to an embodiment of the present invention.

FIG. 5 shows a flowchart of a signal processing method according to an embodiment of the present invention. The signal processing method is applied to a wireless receiving system, and includes the following steps. In step S51, a packet is received and decoded to generate a decoding result. In step S52, packet length information is retrieved from the decoding result, and a transmission end time is estimated according to the packet length information. In step S53, a search start time is determined according to the transmission end time, and packet searching is started from the search start time.

Various operation details and modifications (e.g., the method for selecting the search start time) in the description associated with the wireless receiving system 200 are applicable to the signal processing method in FIG. 5, and shall be omitted herein.

In conclusion, with the wireless receiving system and the signal processing method of the present invention, the issue of missing packets is solved by bringing forward the time to start searching a subsequent packet. Compared to the prior art, the system and method of the present invention offer lower hardware costs and reduced power consumption.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless receiving system, comprising:
   a decoding module, configured to receive and decode a packet to generate a decoding result;
   an estimating module, configured to retrieve packet length information from the decoding result, and to estimate an estimated transmission end time of the packet according to the packet length information; and
   a searching module, configured to determine a search start time according to the estimated transmission end time, and to start packet searching at the search start time;
   wherein, the estimating module retrieves the packet length information from a part of the decoding result, and estimates the estimated transmission end time of the packet before the packet is completely decoded.

2. The wireless receiving system according to claim 1, wherein the searching module adds the estimated transmission end time with a minimum packet interval to generate the search start time.

3. A wireless receiving system, comprising:
   a decoding module, configured to receive and decode a packet to generate a decoding result;
   an estimating module, configured to retrieve packet length information from the decoding result, and to estimate an estimated transmission end time of the packet according to the packet length information; and
   a searching module, configured to determine a search start time according to the estimated transmission end time, and to start packet searching at the search start time;
   wherein, the estimating module estimates the estimated transmission end time by adding a start time of the packet with an estimated length, the packet is compliant to a legacy mode of 802.11n specifications, the packet length information comprises a parameter LENGTH and a parameter N_DBPS, and the estimating module estimates the estimated length according to:

$$L=\text{Ceiling}((\text{LENGTH}*8+22)/N\_DBPS)*4 \text{ μs; and}$$

wherein, the calculation symbol Ceiling represents a minimum integer greater than or equal to a calculation target, and the estimated length is the length L added with a predetermined packet interval length.

4. The wireless receiving system according to claim 3, wherein the searching module adds the estimated transmission end time with a minimum packet interval to generate the search start time.

5. A wireless receiving system, comprising:
   a decoding module, configured to receive and decode a packet to generate a decoding result;
   an estimating module, configured to retrieve packet length information from the decoding result, and to estimate an estimated transmission end time of the packet according to the packet length information; and
   a searching module, configured to determine a search start time according to the estimated transmission end time, and to start packet searching at the search start time;
   wherein, the estimating module estimates the estimated transmission end time by adding a start time of the packet with an estimated length of the packet, the packet is compliant to a high throughput mixed mode of 802.11n specifications, the packet length comprises a parameter HT_LENGTH and a parameter HT_N_DBPS, and the estimating module estimates the estimated length according to:

$$L=\text{Ceiling}((HT\_LENGTH*8+22)/HT\_N\_DBPS)*4 \text{ μs}+8 \text{ μs; or}$$

$$L=\text{Ceiling}((HT\_LENGTH*8+22)/HT\_N\_DBPS)*3.2 \text{ μs}+8 \text{ μs; and}$$

wherein, the calculation symbol Ceiling represents a minimum integer greater than or equal to a calculation target, and the estimated length is the length L added with a predetermined packet interval length.

6. The wireless receiving system according to claim 5, wherein the searching module adds the estimated transmission end time with a minimum packet interval to generate the search start time.

7. A wireless receiving system, comprising:
   a decoding module, configured to receive and decode a packet to generate a decoding result;
   an estimating module, configured to retrieve packet length information from the decoding result, and to estimate an estimated transmission end time of the packet according to the packet length information; and
   a searching module configured to determine a search start time according to the estimated transmission end time, and to start packet searching at the search start time;
   wherein, the estimating module estimates the estimated transmission end time by adding a start time of the packet with an estimated length of the packet, the packet is compliant to a high throughput greenfield mode of 802.11n specifications, the packet length comprises a parameter HT_LENGTH and a parameter HT_N_DBPS, and the estimating module estimates the estimated length according to:

$$L=\text{Ceiling}((HT\_LENGTH*8+22)/HT\_N\_DBPS)*4 \text{ μs; and}$$

wherein, the calculation symbol Ceiling represents a minimum integer greater than or equal to a calculation target, and the estimated length is the length L added with a predetermined packet interval length.

8. The wireless receiving system according to claim 7, wherein the searching module adds the estimated transmission end time with a minimum packet interval to generate the search start time.

9. A signal processing method, applied to a wireless receiving system, comprising:
   a) receiving and decoding a packet to generate a decoding result;
   b) retrieving packet length information from the decoding result, and estimating an estimated transmission end time of the packet according to the packet length information; and c) determining a search start time according to the estimated transmission end time, and starting packet searching at the search start time;
wherein, step (b) comprises retrieving the packet length information from a part of the decoding result, and estimating the estimated transmission end time of the packet before the packet is completely decoded.

10. The signal processing method according to claim 9, wherein step (c) comprises adding the estimated transmission end time with a minimum packet interval to generate the search start time.

11. A signal processing method, applied to a wireless receiving system, comprising:
a) receiving and decoding a packet to generate a decoding result;
b) retrieving packet length information from the decoding result, and estimating an estimated transmission end time of the packet according to the packet length information; and
c) determining a search start time according to the estimated transmission end time, and starting packet searching at the search start time;
wherein, step (b) comprises estimating the estimated transmission end time by adding a start time of the packet with an estimated length, the packet is compliant to a legacy mode of 802.11n specifications, the packet length information comprises a parameter LENGTH and a parameter N_DBPS, and step (b) comprises estimating the estimated length according to:

$$L=\text{Ceiling}((\mathit{LENGTH}*8+22)/\mathit{N\_DBPS})*4 \text{ μs; and}$$

wherein, the calculation symbol Ceiling represents a minimum integer greater than or equal to a calculation target, and the estimated length is the length L added with a predetermined packet interval length.

12. The signal processing method according to claim 11, wherein step (c) comprises adding the estimated transmission end time with a minimum packet interval to generate the search start time.

13. A signal processing method, applied to a wireless receiving system, comprising:
a) receiving and decoding a packet to generate a decoding result;
b) retrieving packet length information from the decoding result, and estimating an estimated transmission end time of the packet according to the packet length information; and
c) determining a search start time according to the estimated transmission end time, and starting packet searching at the search start time;
wherein, step (b) comprises estimating the estimated transmission end time by adding a start time of the packet with an estimated length of the packet, the packet is compliant to a high throughput mixed mode of 802.11n specifications, the packet length comprises a parameter HT_LENGTH and a parameter HT_N_DBPS, and step (b) comprises estimating the estimated length according to:

$$L=\text{Ceiling}((\mathit{HT\_LENGTH}*8+22)/\mathit{HT\_N\_DBPS})*4 \text{ μs}+8 \text{ μs; or}$$

$$L=\text{Ceiling}((\mathit{HT\_LENGTH}*8+22)/\mathit{HT\_N\_DBPS})*3.2 \text{ μs}+8 \text{ μs; and}$$

wherein, the calculation symbol Ceiling represents a minimum integer greater than or equal to a calculation target, and the estimated length is the length L added with a predetermined packet interval length.

14. The signal processing method according to claim 13, wherein step (c) comprises adding the estimated transmission end time with a minimum packet interval to generate the search start time.

15. A signal processing method, applied to a wireless receiving system, comprising:
a) receiving and decoding a packet to generate a decoding result;
b) retrieving packet length information from the decoding result, and estimating an estimated transmission end time of the packet according to the packet length information; and
determining a search start time according to the estimated transmission end time, and starting packet searching at the search start time;
wherein, step (b) comprises estimating the estimated transmission end time by adding a start time of the packet with an estimated length of the packet, the packet is compliant to a high throughput greenfield mode of 802.11n specifications, the packet length comprises a parameter HT_LENGTH and a parameter HT_N_DBPS, and step (b) comprises estimating the estimated length according to:

$$L=\text{Ceiling}((\mathit{HT\_LENGTH}*8+22)/\mathit{HT\_N\_DBPS})*4 \text{ μs; and}$$

wherein, the calculation symbol Ceiling represents a minimum integer greater than or equal to a calculation target, and the estimated length is the length L added with a predetermined packet interval length.

16. The signal processing method according to claim 15, wherein step (c) comprises adding the estimated transmission end time with a minimum packet interval to generate the search start time.

* * * * *